A. F. SANBORN, Jr.
SPRING SUPPORT FOR HAMMOCKS.
APPLICATION FILED JUNE 1, 1910.
965,838.
Patented July 26, 1910.
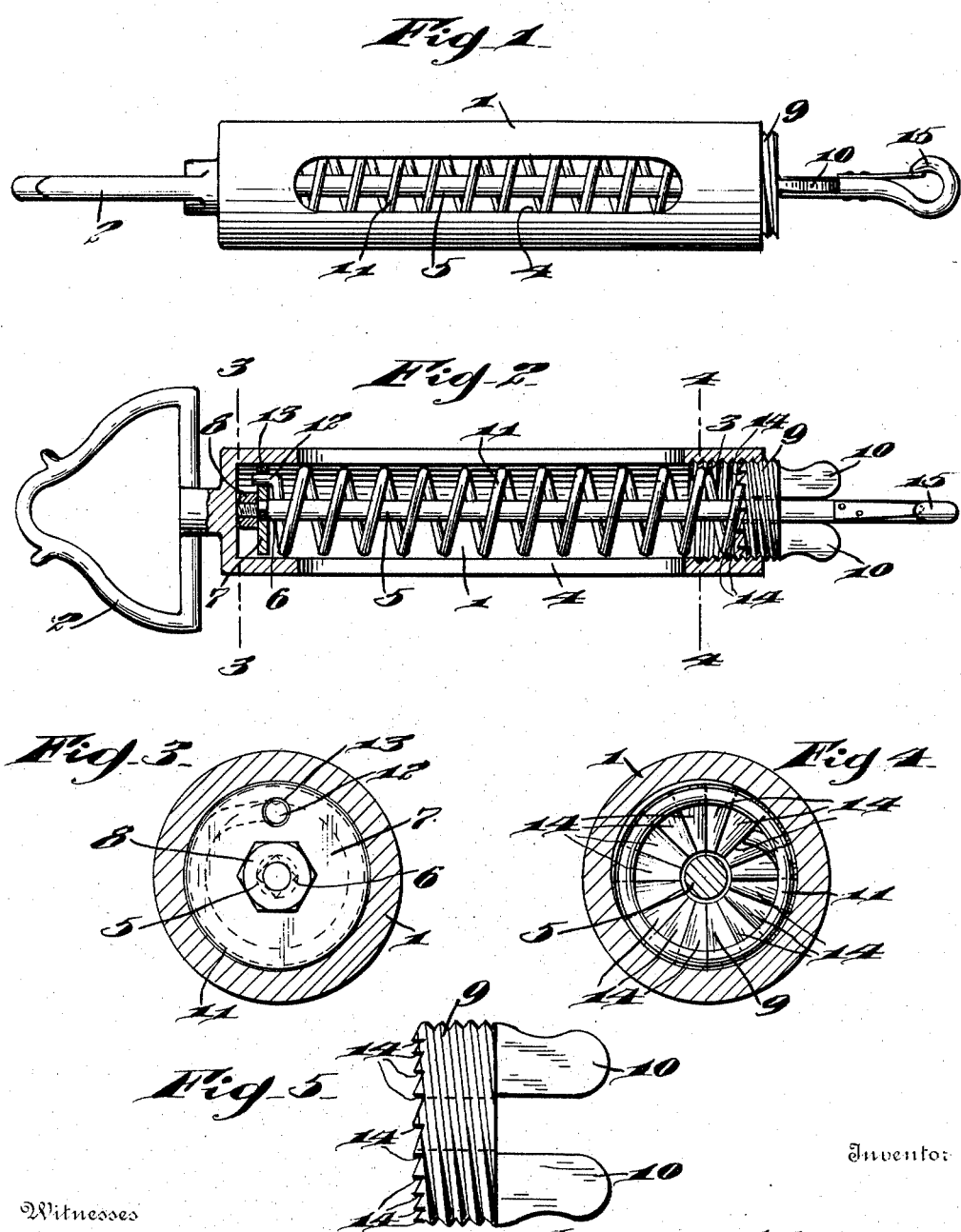
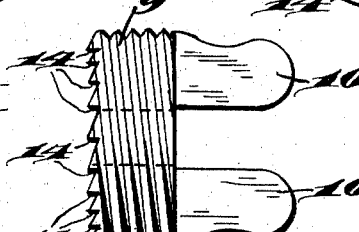

UNITED STATES PATENT OFFICE.

ANDREW F. SANBORN, JR., OF PHILADELPHIA, PENNSYLVANIA.

SPRING-SUPPORT FOR HAMMOCKS.

965,838.  Specification of Letters Patent.  Patented July 26, 1910.

Application filed June 1, 1910. Serial No. 564,450.

*To all whom it may concern:*

Be it known that I, ANDREW F. SANBORN, Jr., a citizen of the United States, residing at Philadelphia, in the county of Philadelphia and State of Pennsylvania, have invented certain new and useful Improvements in Spring-Supports for Hammocks, of which the following is a specification.

My invention relates to improvements in spring supports for hammocks, the object of the invention being to provide an attachment which may be used in connection with any ordinary hammock, and which will give an elastic support to the hammock rendering the latter more comfortable to the user.

A further object is to provide an improved device of this character in which the tension of the spring may be adjusted to suit conditions, and which permits the removal and replacing of a worn or broken spring whenever desired.

With these and other objects in view, the invention consists in certain novel features of construction and combinations and arrangements of parts, as will be more fully hereinafter described and pointed out in the claims.

In the accompanying drawings: Figure 1, is a view in elevation illustrating my improvements. Fig. 2, is a view in longitudinal section. Fig. 3, is an enlarged view in cross section on the line 3—3 of Fig. 2. Fig. 4, is a similar view in cross section on the line 4—4 of Fig. 2, and Fig. 5, is an enlarged view in side elevation of the adjusting nut.

1, represents a cylindrical casing having an open end and a closed end, and a loop or hanger 2 is fixed to or made integral with the closed end of the casing. The open end of the casing is provided with internal screw-threads 3, and longitudinal slots 4 are provided in the casing, as clearly shown.

5, represents a rod which extends longitudinally through the casing and is provided near its inner end with an angular portion 6 to enter an angular central opening in a disk 7, and the extreme end of the rod 5 is screw-threaded to receive a nut 8 screwed against the disk 7 to hold it rigidly in place, it being understood that as the main portion of rod 5 is cylindrical, shoulders will be formed at the juncture of the cylindrical portion of the rod and the angular portion 6, and the nut 8 will hold the disk tightly against these shoulders.

9, represents my improved adjusting nut which is provided with a central opening to accommodate rod 5, and on its outer face at opposite sides of the opening, the nut 9 is provided with wings 10 to permit it to be readily grasped between the fingers and turned.

Located within casing 1, around rod 5, is a coiled spring 11, one end of which is bent at an angle forming a lug 12 projected through an opening 13 in disk 7. The other end of the spring acts as a ratchet dog and bears against a circular series of ratchet teeth 14 on the inner face of nut 9, so that while the spring permits this nut to turn from left to right to move the nut inward and increase the tension of the spring, it prevents any retrograde movement of the nut and securely locks it in the position to which it is adjusted.

If it is desired to remove the nut or to lighten the tension, a suitable tool may be inserted through one of the slots 4 in casing 1 to hold back the spring from engagement with the nut, while the latter is being screwed out. A hook 15 is provided on the free end of rod 5, which is adapted to receive a loop on a hammock, while the loop 2 above referred to is adapted to be caught over a support. A weight on the hammock moves the disk 7 toward the nut 9 and compresses spring 11, and this affords an elastic support for the hammock which renders the latter extremely comfortable to the occupant.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a device of the character described, the combination with a cylindrical casing having a closed end and an internally screw-threaded open end, a longitudinal rod located within the casing, connecting devices at the end of the casing and on said rod, a disk secured on the inner end of the rod, a nut screwed into the open end of the casing, a coiled spring around the rod between the disk and said nut, one end of said spring secured to the disk, and a circular series of ratchet teeth on the inner face of the nut against which the spring bears, substantially as described.

2. In a device of the character described, the combination with a cylindrical casing having a closed end, an internally screw-threaded open end and longitudinal slots, of a rod extending longitudinally in the casing, said rod having an angular portion adjacent its inner end, and a screw-threaded inner end, a disk having an angular central opening positioned on the angular portion of said rod, a nut screwed on the threaded end of said rod and bearing against said disk, said disk having an opening therein, a coiled spring located within the casing around the rod, one end of said spring bent at an angle and projected through the last-mentioned opening in the disk, a nut screwed into the threaded open end of said casing, wings on the outer end of said nut, and a circular series of ratchet teeth on the inner face of said nut against which the end of said spring engages, substantially as described.

In testimony whereof I have signed my name to this specification in the presence of two subscribing witnesses.

ANDREW F. SANBORN, Jr.

Witnesses:
R. H. KRENKEL,
C. E. POTTS.